Oct. 14, 1930.   C. D. STEWART   1,778,127
AIRPLANE BRAKE
Filed March 22, 1929
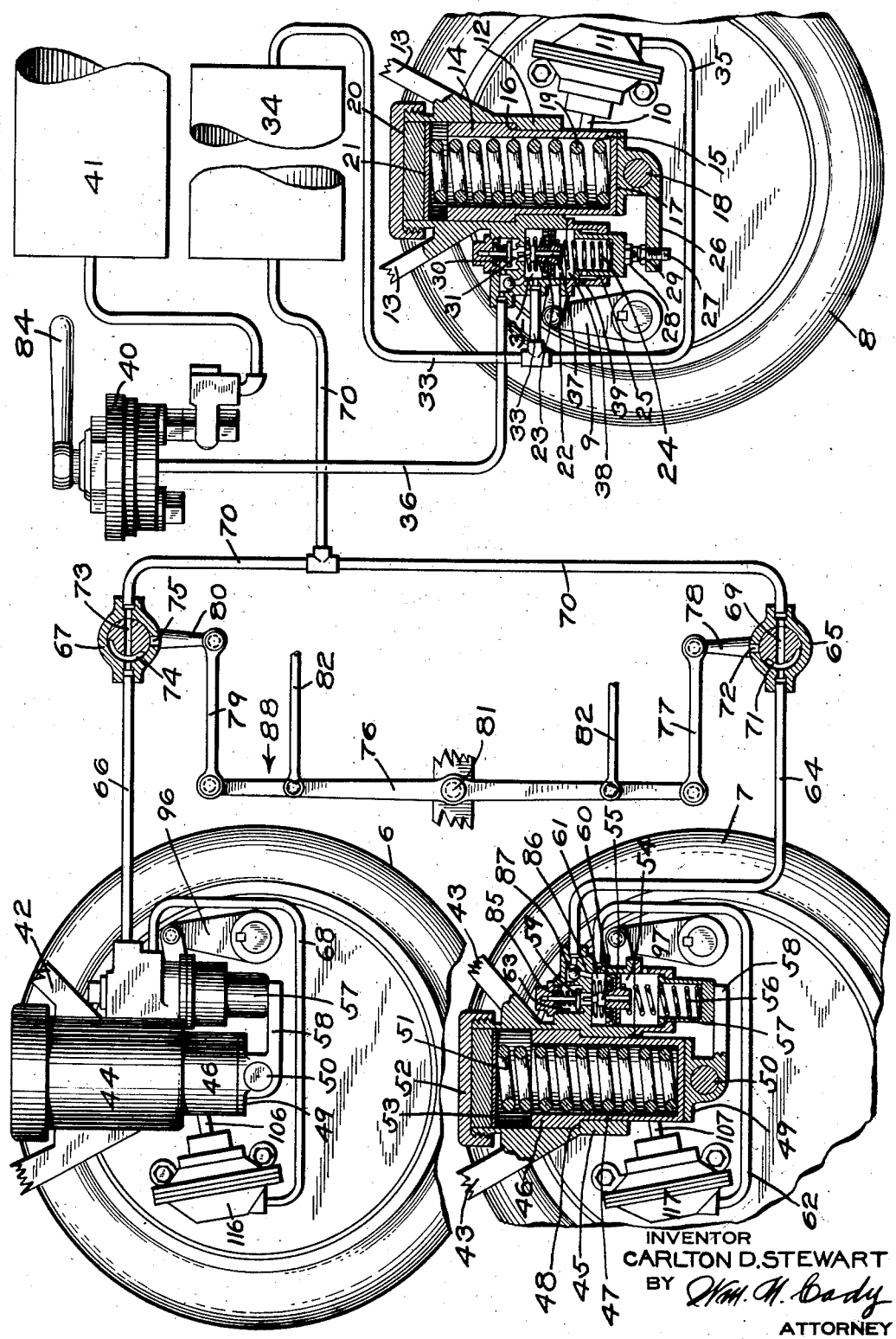
INVENTOR
CARLTON D. STEWART
BY *Wm. H. Cady*
ATTORNEY Patented Oct. 14, 1930

1,778,127

UNITED STATES PATENT OFFICE

CARLTON D. STEWART, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA

AIRPLANE BRAKE

Application filed March 22, 1929. Serial No. 349,152.

This invention relates to brakes, and more particularly to a fluid pressure brake for airplanes.

The invention has special reference to means for applying the brakes on the landing wheels of an airplane of the type shown in a prior pending application for Letters Patent, filed by Sidney G. Down, November 13, 1928, Serial No. 319,137.

An object of the invention is to provide an airplane brake in which the braking force applied to the front landing wheels is controlled through mechanism operated by the airplane controlling mechanism.

Another object of the invention is to provide an improved airplane brake of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing, the single figure is a diagrammatic view, partly in section, of an airplane brake apparatus embodying the invention.

Referring to the drawing, the usual front landing wheels of an airplane are indicated at 6 and 7, while the usual rear wheel is indicated at 8.

Associated with each landing wheel is a brake applying mechanism of any desired type, such as the well known automotive drum and shoe type, having a cam adapted to be operated by a lever for expanding or contracting the brake shoes or brake bands into engagement with the brake drum. This part of the brake being well known, is not shown in the drawing, it being understood that the rocking of levers 9, 96 and 97 associated with the braking mechanism causes the application of the brakes at the respective wheels.

The lever 9 on the rear wheel structure is operatively connected to the stem 10 of a diaphragm brake chamber 11 or other brake cylinder. Likewise the lever 96 on the front wheel 6 structure is operatively connected to the stem 106 of a diaphragm brake chamber 116 or other brake cylinder, while the lever 97 on the front wheel 7 structure is operatively connected to the stem 107 of a diaphragm brake chamber 117 or other brake cylinder. By supplying fluid to the brake chambers 11, 116 and 117, the levers 9, 96 and 97 respectively are rocked to apply the brakes, and when fluid is released from the brake chambers, the brakes are released.

The brake controlling mechanism for the rear wheel may comprise a casing 12 carried by the wheel supports 13. Mounted in a cylindrical bore of the casing is a hollow cylindrical plunger 14 having a reduced cylindrical section 15 forming a shoulder 16, which is adapted to engage a corresponding shoulder formed in the casing 12. The closed lower end of the plunger 14 engages a member 17 which is mounted on the wheel axle 18.

A coil spring 19 is mounted within the plunger 14 and is held in place by a cover plate 20 having screw-threaded engagement in the casing 12, so that relative movement between the airplane body and the wheel is opposed by the compression of the spring. A rubber pad 21 may be interposed between the upper end of the spring 19 and the cover plate 20.

In the casing 12, adjacent to the bore containing the plunger 14, there is a cylindrical bore 22 containing a piston 23, subject on one side to the pressure of a coil spring 24. The spring 24 extends into a hollow cylindrical member 25 and the member 17 carries an arm 26 adapted to position the member 25. In order to regulate the spacing between the member 25 and the arm 26, a bolt 27 having screw-threaded engagement in the arm, has its head 28 engaging the member 25 and carries a jam nut 29 for locking the bolt in its adjusted position.

A fluid pressure supply valve 30 carries on its stem an exhaust valve 31 and the exhaust valve is adapted to seat on a valve seat carried by the piston 23. The chamber 32 above piston 23 is connected to a pipe 33 which leads to a reservoir 34 and said pipe also connects with a pipe 35 leading to the brake chamber 11.

The unseating of supply valve 30 connects pipe 36 with chamber 32 and when the exhaust valve 31 is unseated, the chamber 32 is connected through a passage 37 in the piston 23 with chamber 38 at the opposite side of the piston, which chamber is open to the atmosphere through a port 39.

A brake valve device 40 of any desired type is adapted to be manually operated to control the supply of fluid under pressure from a storage reservoir 41 to pipe 36, or the release of fluid under pressure from said pipe.

The front landing wheel 6 is carried on a support 42, and the front landing wheel 7 is carried on a similar support 43. The support 42 carries a casing 44 and the support 43 carries a casing 45. The casings 44 and 45 each contain control valve mechanism through which fluid under pressure is supplied to the brake cylinders 116 and 117 respectively.

As the control valve mechanism for each front landing wheel is similar in construction, the mechanism associated with the wheel 7 only is shown in detail. It will also be understood that the control valve mechanism for the front landing wheel brakes may be substantially similar to the mechanism for the rear landing wheel 8.

Mounted in a cylindrical bore of the casing 45 is a hollow cylindrical plunger 46 having a reduced cylindrical section 47 forming a shoulder 48, which is adapted to engage a corresponding shoulder formed in the casing 45. The closed lower end of the plunger 46 engages a member 49, which is mounted on the wheel axle 50.

A coil spring 51 is mounted within the plunger 46 and is held in place by a cover plate 52 having screw-threaded engagement in the casing 45, so that relative movement between the airplane body and the wheel is opposed by the compression of the spring. A rubber pad 53 may be interposed between the upper end of the spring 51 and the cover plate 52.

In the casing 45, adjacent to the bore containing the plunger 46, there is a cylindrical bore 54 containing a piston 55, subject on one side to the pressure of a coil spring 56. The spring 56 extends into a hollow cylindrical member 57 and the member 49 carries an arm 58 adapted to position the member 57.

A fluid pressure supply valve 59 carries on its stem an exhaust valve 60 and the exhaust valve is adapted to seat on a valve seat carried by the piston 55. The chamber 61 above piston 55 is connected to a pipe 62 which leads to the brake chamber 117, and the chamber 63 of the supply valve 59 is connected to a pipe 64 which leads to a plug valve 65.

Likewise the supply valve chamber of the control valve mechanism for the front landing wheel 6 is connected by a pipe 66 to a plug valve 67 similar in construction to the plug valve 65, while the piston chamber of the control valve mechanism for the front landing wheel 6 is connected by a pipe 68 to the brake chamber 116.

The plug of the valve 65 is formed with a port 69 adapted to establish communication, in one position of the plug, between pipe 64 and a pipe 70 which leads to the reservoir 34 heretofore referred to. A cavity 71 in the plug of the valve 65 is provided to connect the pipe 64 with an exhaust port 72.

Pipe 70 is also connected to the valve 67, and the plug of valve 67 is formed with a port 73 adapted to establish communication, in one position of the plug, between pipe 70 and pipe 66. The plug of the valve 67 is also provided with a cavity 74 for connecting the the pipe 66 with an exhaust port 75 when the plug valve is rotated, as will be hereinafter described.

One end of the airplane control lever 76 is connected by a link 77 to an arm 78 projecting laterally from the plug of the valve 65, while the opposite end of said control lever is connected by a link 79 to an arm 80 projecting laterally from the plug of the valve 67. Intermediate of its ends, the control lever 76 is pivotally connected, as at 81 to a portion of the airplane body, and on each side of this pivot, the control lever is fixed to a link 82 for operating the airplane rudder (not shown).

In operation, when the airplane is about to land the operator may apply the brakes by operating the brake valve handle 84, so as to admit fluid under pressure from the reservoir 41 to the pipe 36.

On the rear wheel 8, the parts of the controlling valve mechanism are so disposed that the spring 19 is under initial compression when the rear wheel is free from the ground and the member 25 is so positioned as to hold the spring 24 in such a position, according to the adjustment of the bolt 27 that the piston 23 will be held in a position to unseat the valve 30, while the exhaust valve 31 is held seated on the piston. As a consequence, when fluid under pressure is supplied to pipe 36, the fluid flows past the open valve 30 to chamber 32 and thence through pipe 33 to pipe 35 and the brake chamber 11, so that the brake is applied on the rear wheel. The reservoir 34 will also be charged with fluid under pressure through pipe 33, and from this reservoir the fluid under pressure will flow through pipe 70 to the plug valves 65 and 67 respectively.

With the plugs of the valves 65 and 67 positioned as shown in the drawings, the fluid under pressure will flow to the chamber 63 on the front wheel 7 through port 69 and pipe 64, and to the corresponding chamber on the front wheel 6 through port 73 and pipe 66.

On the rear wheel 8, when the fluid pressure in the chamber 32 has been increased to a degree slightly in excess of the pressure of spring 24, the piston 23 will be moved downwardly, until the supply valve 30 has been moved to its seat.

The brake chamber 11 is thus charged with fluid at a predetermined pressure, as determined by the spring 24, and the reservoir 34 is also charged to the same pressure.

However, the brakes at the front wheels 6 and 7 are not applied, for the reason that the controlling valve devices at the front wheels are so adjusted that the spring 56 does not exert an initial force on the piston 55. The result is that the supply valve 59 at each front wheel is normally held closed by its spring 85, so that communication is cut off from the chamber 63 to the chamber 61 and the brake chambers 116 and 117 respectively.

When the rear wheel 8 hits the ground, the initial braking force, as above provided, acts to retard rotation of the wheel, and in addition, the spring 19 is compressed in proportion to the force with which the wheel strikes the ground. Compression of the spring 19 permits relative movement between the wheel axle 18 and the airplane body, so that the member 25 is moved to compress the spring 24 to a corresponding extent. The supply valve 30 is then opened by the upward movement of piston 23, due to the compression of spring 24, and a further supply of fluid under pressure is admitted to pipes 33 and 35, and the brake chamber 11, as well as to the reservoir 34.

When the front wheels strike the ground, the spring 51 associated with the controlling valve device of each wheel is compressed in proportion to the pressure exerted on the wheel by the airplane body and thus causes a relative movement between the airplane body and the wheel axle 50, so that the spring 56 causes the corresponding upward movement of piston 55. The supply valve 59 is thus opened at each front wheel, so as to admit fluid under pressure from the reservoir 34 to the brake chambers 116 and 117 respectively.

When the pressure of fluid in chamber 61 slightly exceeds the pressure of spring 56, the piston 55 is moved so as to permit the supply valve 59 to seat and thus cut off the further supply of fluid under pressure to the brake chamber.

It will be seen that the braking pressure at each front wheel is proportional to the load on each wheel, and the corresponding compression of the spring 51. It will also be evident that in any event, the pressure of fluid supplied to the brake chambers 116 and 117 cannot exceed that supplied to the brake chamber 11 at the rear wheel 8, since the source of fluid pressure for the front wheels is the reservoir 34, which is charged only to the pressure of fluid admitted to the brake chamber 11.

Should the front wheels hit the ground before the rear wheel, the pressure will be limited to the pressure initially supplied to the rear wheel brake chamber and no higher pressure can be applied to the front wheels until the rear wheel hits the ground.

If the rear wheel should rebound off the ground, or should the pressure of the airplane body on the wheel be otherwise relieved, the spring 19 will be permitted to expand a corresponding amount, and thereby the member 25 will be permitted to move so as to relieve the pressure on spring 24. As a consequence, the piston 23 of the controlling valve device at the rear wheel will be moved downwardly by the pressure of fluid acting in chamber 32 and the exhaust valve 31 will be unseated. Fluid under pressure is then released from the brake chamber 11 and from the reservoir 34 until the pressure in chamber 32 has been reduced to a degree slightly less than the reduced pressure of spring 24, when the piston 23 will move up to seat against the valve 31 and thus cut off the further exhaust of fluid from the brake chamber 11.

Fluid under pressure is also released from the brake chambers 116 and 117 by way of by-pass 86 leading from chamber 61 and controlled by the call check valve 87. The by-passes 86 also permit the release of fluid under pressure from the brake chambers 116 and 117 by the operation of the brake valve device 40 after the airplane has been brought to rest on the ground.

In the same way as described in connection with the rear wheel 8, if either front wheel should leave the ground, the controlling valve device will operate to automatically release fluid under pressure from the corresponding brake chamber.

It will be seen that the brake is applied to each landing wheel of the airplane in direct proportion to the load exerted on each wheel, but that at no time can the braking pressure at the front wheels exceed the braking pressure exerted at the rear wheel.

Should the load on any wheel decrease after coming in contact with the ground, any excessive braking pressure will be automatically released, locally at the front wheels, and from all three wheels by way of the rear wheel controlling valve device.

With the present invention, the brakes can be applied to either front wheel while the airplane is moving on the ground. When the operator swings the control lever 76 to steer the airplane toward the right or toward the left, the plug valves in the fluid supply pipes of the front wheel control valve mechanisms will be actuated to cut off communication from the reservoir 34 to either control valve mechanism.

When the control lever 76 is in neutral position, as shown in the drawing, the chamber 63 at both front wheels will be supplied with fluid under pressure from the reservoir 34 and the front wheel brakes will be applied in the manner above described. However, when the operator swings the control lever to turn the airplane toward the right (see arrow 88), the plug of the valve 65 will be rotated so as to connect valve cavity 71 with the exhaust port 72, and the plug of the valve 67 will be also rotated. The supply of fluid under pressure from the reservoir 34 through port 69 to valve chamber 63 at the front wheel 7 will thus be cut off, and the valve chamber 63 will be open to atmosphere through pipe 64, valve cavity 71, and port 72. The fluid under pressure in piston chamber 61 will also be vented to the atmosphere through by-pass 86, past ball check valve 87, pipe 64, valve cavity 71, and port 72. In this way the fluid under pressure will be released from the brake chamber 117, thereby permitting free rotation of the front wheel 7.

On the other hand, when the plug of the valve 67 is rotated, port 73 will be moved out of registration with the ends of pipes 66 and 70, thereby cutting off the supply of fluid from the reservoir 34 to the control valve mechanism at the front wheel 6. The fluid under pressure in the control valve mechanism at the front wheel 6 is therefore bottled up, and the brake will be applied in the manner above described.

When the airplane has been brought to rest on the ground and the control lever 76 returned to the neutral position shown in the drawing, the plugs of the valves 65 and 67 will be so disposed as to aline the ports 69 and 73 respectively with the pipe openings, thereby reestablishing communication between the reservoir 34 and the front wheel controlling valve mechanisms. The by-passes controlled by the ball check valves at each wheel permit the release of fluid from the equipment by the operation of the brake valve device 40 in the usual manner.

If, while the airplane is moving in an arc on the ground, as has been described, the control lever 76 is returned to the neutral position, the plugs of the valves 65 and 67 will also be moved to aline the ports 69 and 73 respectively with the pipe openings, thereby permitting the fluid under pressure to equalize in the chambers at both front wheels to apply both brakes.

It is to be understood that the construction and arrangement of the plug valves 65 and 67 is such that either front wheel brake will be applied when the airplane is steered to the right or to the left while on the ground.

A skid may in some cases be employed in place of the rear wheel, in which case the skid operates to control the operation of the controlling valve device in the same manner as the rear wheel.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In an airplane brake, the combination with a rear landing wheel and front landing wheels, of a brake device associated with each wheel, means associated with the rear wheel for controlling the fluid pressure for operating the front wheel brakes, and means associated with the front wheels for individually releasing each front wheel brake independently of said rear wheel fluid controlling means.

2. In an airplane brake, the combination with a rear landing wheel and front landing wheels, of a fluid pressure brake device associated with each wheel, a reservoir from which fluid under pressure is supplied for operating the front wheel brakes, means associated with the rear wheel brake for controlling the supply of fluid under pressure to said reservoir, and means for cutting off communication between said reservoir and said front wheels.

3. In an airplane, the combination with front and rear landing wheels, a fluid pressure brake device associated with each landing wheel, means for controlling the supply and release of fluid under pressure to and from said brake devices, valve means for controlling the supply and release of fluid under pressure to and from said front wheel brake devices independently of said rear wheel fluid control means, and means actuated by the rudder-controlling means of said airplane for cutting off the supply of fluid under pressure to said front wheels and for individually releasing said front wheel brakes.

4. In an airplane brake the combination with a rear landing wheel and front landing wheels, of a fluid pressure actuated brake device associated with each wheel, a reservoir from which fluid under pressure is supplied for operating the front wheel brakes, means associated with the rear wheel brake for controlling the supply of fluid under pressure to said reservoir, valve means for controlling the supply and release of fluid under pressure from said reservoir to said front wheel brakes, and means actuated by the rudder-controlling means of said airplane for releasing the fluid under pressure from one front wheel brake and for cutting off the supply of fluid under pressure from the reservoir to the other front wheel brake.

5. A device of the class described comprising landing wheels for an airplane, each wheel having a fluid pressure brake device, a control lever for the airplane, means for automatically supplying and releasing fluid under pressure to each brake device, and a single valve device associated with each brake device and actuated by said control lever for releasing each brake independently of said fluid supplying and releasing means.

In testimony whereof I have hereunto set my hand, this 16th day of March, 1929.

CARLTON D. STEWART